United States Patent [19]

Hayashi

[11] Patent Number: 4,992,971
[45] Date of Patent: Feb. 12, 1991

[54] METHOD AND APPARATUS FOR AN AUTOMATIC CHECK OF WHETHER OR NOT CALLING PARAMETERS CORRESPOND TO CALLED PARAMETERS DURING LINKAGE OPERATION

[75] Inventor: Kazuhisa Hayashi, Tokyo, Japan

[73] Assignee: NEC Corporation, Tokyo, Japan

[21] Appl. No.: 192,697

[22] Filed: May 10, 1988

[30] Foreign Application Priority Data

May 11, 1987 [JP] Japan ................................ 62-112519

[51] Int. Cl.5 .............................................. G06F 7/20
[52] U.S. Cl. .................................... 364/900; 364/200
[58] Field of Search .............................. 364/200, 900

[56] References Cited

U.S. PATENT DOCUMENTS

| | | | |
|---|---|---|---|
| 4,096,573 | 6/1978 | Heller et al. | 364/200 |
| 4,136,385 | 1/1979 | Gannon et al. | 364/200 |
| 4,323,963 | 4/1982 | Wu | 364/200 |
| 4,355,355 | 10/1982 | Butwell et al. | 364/200 |
| 4,366,537 | 12/1982 | Heller et al. | 364/200 |
| 4,707,661 | 11/1987 | Hoenninger, III et al. | 364/413.3 |
| 4,862,351 | 8/1989 | Green et al. | 364/200 |

OTHER PUBLICATIONS

Andrew S. Tanenbaum; Structured Computer Organization, Englewood Cliffs, N.J.; Prentice-Hall, 1984.

*Primary Examiner*—Michael R. Fleming
*Assistant Examiner*—C. Shin
*Attorney, Agent, or Firm*—Foley & Lardner, Schwartz, Jeffery, Schwaab, Mack, Blumenthal & Evans

[57] ABSTRACT

In a language translating and linking system for translating and linking into a load program a plurality of source programs which include a calling program, having a first number of calling parameters, and a called program, having a second number of called parameters, the calling parameters must correspond to the respective called parameters. For this purpose, a compiler generates first and second parameter information representative of the calling and the called parameters from the calling and the called programs, respectively. A compiling unit memorizes the first and the second parameter information as first and second memorized parameter information. A linker compares the first memorized parameter information with the second memorized parameter information to check whether or not the calling parameters correspond to the respective called parameters. The first parameter information comprises the first number and attributes of the calling parameters while the second parameter information comprises the second number and attributes of the called parameters.

2 Claims, 3 Drawing Sheets

METHOD AND APPARATUS FOR AN AUTOMATIC CHECK OF WHETHER OR NOT CALLING PARAMETERS CORRESPOND TO CALLED PARAMETERS DURING LINKAGE OPERATION

BACKGROUND OF THE INVENTION

This invention relates to a method for use in a language translating and linking system for translating and linking into a load program a plurality of source programs which include a calling program having calling parameters and a called program having called parameters. More particularly, this invention relates to a method of checking whether or not the calling parameters correspond to the called parameters. This invention relates also to a parameter checking apparatus for use in carrying out the method.

Being written in a particular high-level language, for example, FORTRAN or COBOL, source programs can not be executed directly by a computer. The source programs must therefore be translated and linked into the load program written in machine language. Such a translation and linkage operation is processed by the computer using a previously written language translating and linking program for the particular high-level language. In this manner, the computer should carry out the translation and linkage operation before execution of the source programs. It is usual in the art to refer to the computer carrying out the translation and linkage operation as a language translating and linking system. It is well known in the art that the language translating and linking system comprises a combination of a language translator or a language processor, such as a compiler, and a linkage editor or a linker.

In a conventional language translating and linking system, a conventional language translator or processor only translates or processes the source programs into a plurality of object programs, respectively. A conventional linker only links the object programs into the load program.

One of the source programs may be the calling program in the manner known in the art. The calling program passes control to another of the source programs that is known as the called program. The calling program may have a first number of calling parameters. The called program may have a second number of called parameters.

Under the circumstances, the calling parameters must correspond to the respective called parameters. For this purpose, a check operation has conventionally been made during programming by a programmer whether or not the calling parameters correspond to the called parameters.

It is to be noted that the programmer may make a mistake while carrying out such a check operation during programming. In this event, it becomes impossible to obtain a correct result during execution of the load program into which the source programs programmed by the programmer are translated and linked by the conventional language translating and linking system. Furthermore, it is extremely difficult, costly, and time consuming to search and locate the cause of the mistake and to correct the source programs.

SUMMARY OF THE INVENTION

It is therefore an object of this invention to provide a method which is automatically and easily capable of checking whether or not calling parameters correspond to called parameters, respectively.

It is another object of this invention to provide a method of the type described, wherein the above-mentioned checking is performed during linkage operation.

It is still another object of this invention to provide a parameter checking apparatus which is automatically and easily capable of checking whether or not calling parameters correspond to called parameters, respectively.

It is yet another object of this invention to provide a parameter checking apparatus of the type described, wherein the above-mentioned checking is performed during linkage operation.

A method to which this invention is applicable, is for use in a language translating and linking system comprising a language translator for translating a plurality of source programs into object programs, respectively, a memorizing unit for storing said object programs as memorized object programs and a linker for linking the memorized object programs to a load program. One of the source programs comprises a calling program while another of the source programs comprises a called program, to which the calling program hands over control. The calling program has a first number of calling parameters while the called program has a second number of called parameters. Each of the calling parameters has a calling attribute which represents a data item containing information about each of the calling parameters, while each of the called parameters has a called attribute which represents a data item containing information about each of the called parameters. The method is for checking whether or not the calling parameters correspond to the respective called parameters. According to this invention, the method comprises the steps of extracting in the language translator the first number and calling attributes from the calling program to generate first parameter information representing the first number and the calling attributes; extracting in the language translator the second number and called attributes from the called programs to generate second parameter information representing the second number and the called attributes; memorizing the first and the second parameter information in the memorizing unit to produce the first and the second parameter information as first and second output parameter information, and comparing in the linker the first output parameter information with the second output parameter information to check whether or not the calling parameters correspond to the respective called parameters.

A parameter checking apparatus to which this invention is applicable, is for use in a language translating and linking system supplied with a plurality of source programs, the language translating and linking system comprising a language translator for translating the source programs into object programs, respectively, a memorizing unit for storing the object programs as memorized object programs, and a linker for linking the memorized object programs to a load program. One of the source programs comprises a calling program while another of the source programs comprises a called program, to which the calling program hands over control. The calling program has a first number of calling parameters while the called program has a second number of called parameters. Each of the calling parameters has a calling attribute which represents a data item containing information about each of the calling parameters, while each of the called parameters has a called attribute which represents a data item containing information about each of the called parameters. The parameter checking apparatus is for checking whether or not the calling parameters correspond to the respective called parameters. According to this invention, the parameter checking apparatus comprises an extracting means, in the language translator, supplied with the source programs for extracting the first and second numbers and the calling and the called attributes from the calling and the called programs to generate first and second parameter information representing the first and the second numbers and the calling and the called attributes respectively, memorizing means in the memorizing unit and coupled to the extracting means for storing the first and the second parameter information to produce the first and second parameter information as first and second output parameter information, and comparing means, in the linker and coupled to the memorizing means for comparing the first output parameter information with the second output parameter information to check whether or not the calling parameters correspond to the respective called parameters.

DESCRIPTION OF THE PREFERRED EMBODIMENT

Figure 1:
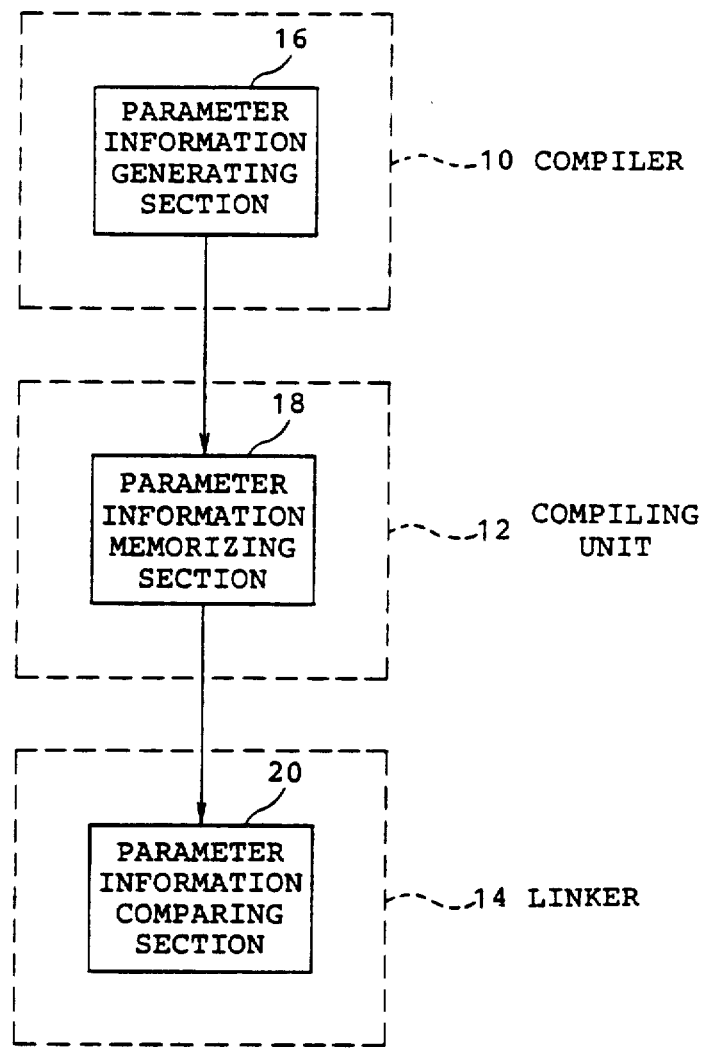
FIG. 1 is a block diagram of a parameter checking apparatus for use in carrying out a method according to an embodiment of this invention.

FIG. 1 illustrates a parameter checking apparatus for use in a language translating and linking system for carrying out a method according to an embodiment of this invention. The language translating and linking system is supplied from input equipment such as a console (not shown) with a plurality of source programs written in a high-level language, for example, FORTRAN, or COBOL. The language translating and linking system is for translating and linking the source programs into a load program written in machine language that can be executed directly by a computer in a known manner.

The illustrated language translating and linking system comprises a compiler 10, a compiling unit 12, and a linker 14. In the manner known in the art, the compiler 10 translates or processes the source programs supplied thereto into a plurality of object programs, respectively. The object programs are supplied to the compiling unit 12. The compiling unit 12 memorizes, or stores, the object programs supplied thereto as memorized object programs. The memorized object programs are supplied to the linker 14. In the manner known in the art, the linker 14 links the memorized object programs supplied thereto to the load program.

As described before, one of the source programs may be a calling program known in the art. The calling program passes, or hands over, control to another of the source programs that is known as a called program. The calling program may have a first number of calling parameters. The first number is a natural number. Similarly, the called program may have a second number of called parameters. The second number is a natural number which may or may not be equal to the first number.

When the calling and the called programs have calling and called parameters, respectively, the calling parameters must correspond to the respective called parameters. For this purpose, the compiler 10 comprises a parameter information generating section 16 supplied with the source programs. The compiling unit 12 comprises a parameter information memorizing section 18 coupled to the parameter information generating section 16. The linker 14 comprises a parameter information comparing section 20 coupled to the parameter information memorizing section 18. The parameter information generating section 16, the parameter information memorizing section 18, and the parameter information comparing section 20 may be referred to collectively as the parameter checking apparatus. The parameter checking apparatus checks whether or not the calling parameters correspond to the respective called parameters, as will later be described in further detail.

Supplied with the source programs, the parameter information generating section 16 generates first and second parameter information from the calling and the called programs, respectively, in a manner to be described later. The first and the second parameter information represents the calling and the called parameters. Each of the first and the second parameter information is supplied to the parameter information memorizing section 18. Supplied with the first and the second parameter information, the parameter information memorizing section 18 memorizes the first and the second parameter information as first and second memorized parameter information which will later be described in further detail. Each of the first and the second memorized parameter information is supplied to the parameter information comparing section 20. Supplied with the first and the second memorized parameter information, the parameter information comparing section 20 compares the first memorized parameter information with the second memorized parameter information to check whether or not the calling parameters correspond to the called parameters. A check is carried out as will later be described in more in detail.

Operation of the parameter checking apparatus of FIG. 1 will be described below with reference to FIGS. 2, 3, and 4.

Figure 2:
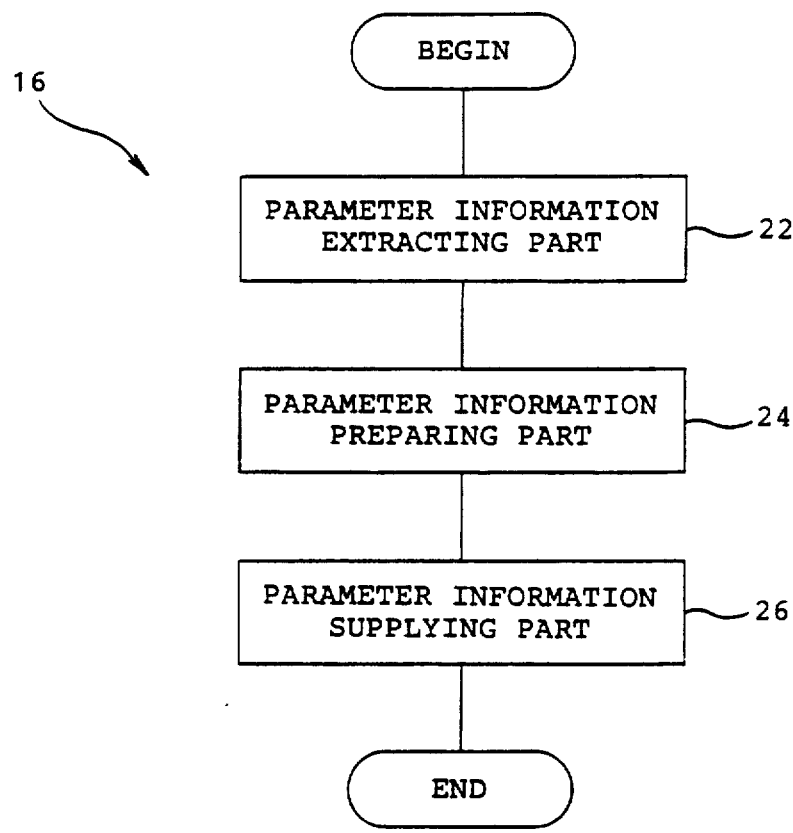
FIG. 2 is a flow chart for use in describing operation of a parameter information generating section used in the parameter checking apparatus.

Referring to FIG. 2, the parameter information generating section 16 of the parameter checking apparatus comprises a parameter information extracting part 22 supplied with the calling and the called programs, a parameter information preparing part 24 coupled to the parameter information extracting part 22, and a parameter information supplying part 26 coupled to the parameter information preparing part 24.

Supplied with the calling program, the parameter information extracting part 22 extracts the first number and attributes of the calling parameters from the calling program. Responsive to the first number and the attributes of the calling parameters, the parameter information preparing part 24 prepares the first parameter information for delivery to the parameter information memorizing section 18 through the parameter information supplying part 26. The first parameter information represents the first number and the attributes of the calling parameters. Each attribute of a parameter (a parameter attribute) represents a data item containing information about the parameter. For example, the parameter attribute indicates whether the parameter is either a binary number or a decimal number, whether the parameter is either a fixed-point or a floating-point number, whether the parameter is either a real number or an imaginary number, or precision of the parameter.

Subsequently, the parameter information extracting part 22 is responsive to the called program. Supplied with the called program, the parameter information extracting part 22 extracts the second number and attributes of the called parameters from the called program. Responsive to the second number and the attributes of the called parameters, the parameter information preparing part 24 prepares the second parameter information for delivery to the parameter information memorizing section 18 through the parameter information supplying part 26. The second parameter information represents the second number and the attributes of the called parameters.

Figure 3:
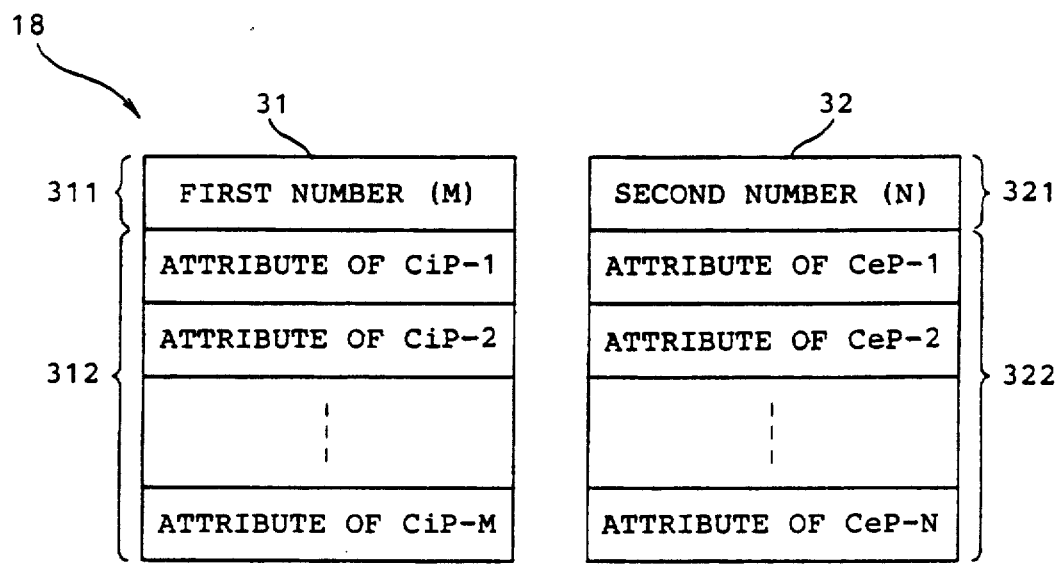
FIG. 3 shows a format for the parameter information stored in a parameter information memorizing section used in the parameter checking apparatus.

Referring to FIG. 3, the parameter information memorizing section 18 comprises first and second memory areas 31 and 32. The first memory area 31 is for memorizing the first parameter information as first memorized parameter information. The second memory area 32 is for memorizing the second parameter information as second memorized parameter information. The first memory area 31 comprises a first number memorizing part 311 for memorizing the first number and a first attribute memorizing part 312 for memorizing the attributes of the calling parameters. Similarly, the second memory area 32 comprises a second number memorizing part 321 for memorizing the second number and a second attribute memorizing part 322 for memorizing the attributes of the called parameters.

The first number will be represented by M and the second number, by N. It will be assumed that the calling parameters comprise first through M-th calling parameters CiP-1 to CiP-M and that the called parameters comprise first through N-th called parameters CeP-1 to CeP-N.

Figure 4:
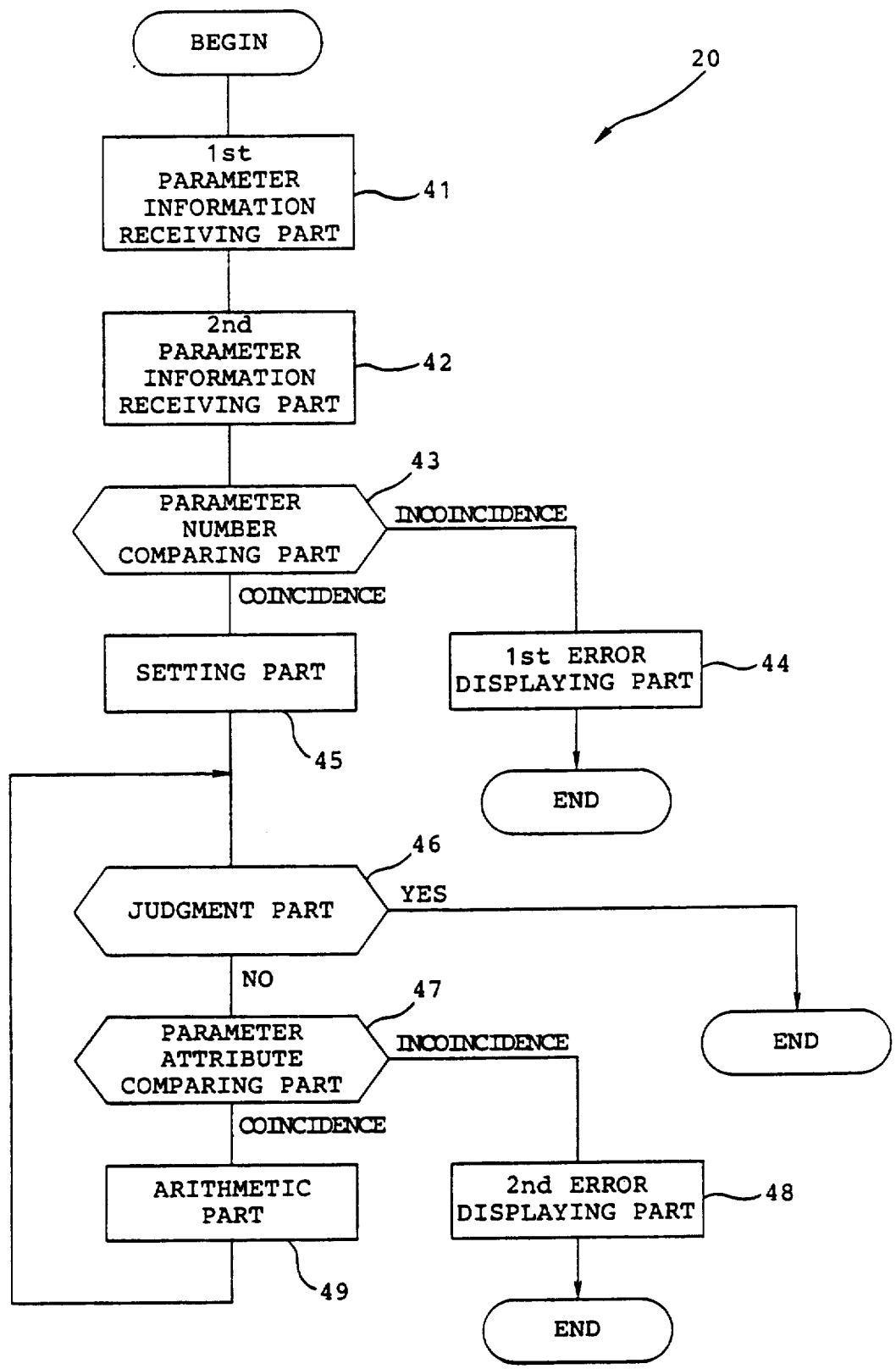
FIG. 4 is a flow chart for use in describing operation of a parameter information comparing section used in the parameter checking apparatus.

Referring to FIG. 4, the parameter information comparing section 20 comprises a first parameter information receiving part 41 for receiving the first parameter information memorized in the first memory area 31 and a second parameter information receiving part 42 for receiving the second parameter information memorized in the second memory area 32. A parameter number comparing part 43 compares the first number M memorized in the first number memorizing part 311 with the second number N memorized in the second number memorizing part 321. If the first and the second numbers M and N do not coincide, a first error displaying part 44 displays an error on a display device (not shown). If the first and the second numbers M and N coincide, a check is made regarding the parameter attribute in a manner to be described in the following.

In order to repeatedly carry out the check a number of times which are equal in number to the first number M or the second number N, a setting part 45 sets a repetition number R for the repeated check. The setting part 45 additionally sets an attribute number of "1" to indicate the first calling parameter CiP-1 and the first called parameter CeP-1. In general, an attribute number of "i" indicates the i-th calling parameter CiP-i and the i-th called parameter CeP-i.

In order to judge whether or not the check comes to an end, a judgment part 46 judges whether or not the repetition number R is equal to zero. If the repetition number R is not equal to zero, a parameter attribute comparing part 47 compares the attribute of the i-th calling parameter CiP-i with the attribute of the i-th called parameter CeP-i with reference to the attribute number "i" transferred from the setting part 45 through the judgment part 46. If the attribute of the i-th calling parameter CiP-i does not coincide with the attribute of the i-th called parameter CeP-i, a second error displaying part 48 displays an error on the display device. If the attribute of the i-th calling parameter CiP-i coincides with the attribute of the i-th called parameter CeP-i, an arithmetic part 49 increments the attribute number by one from i to (i+1) and decrements the repetition number by one from R to (R−1) in order to check whether or not the attribute of the next or the (i+1)-th calling parameter CiP-(i+1) coincides with the attribute of the next or the (i+1)-th called parameter CeP-(i+1). The arithmetic part 49 is followed by the judgment part 46. Therefore, the check is repeatedly made. When the repetition number R becomes equal to zero, it is judged by the judgment part 46 that the check has come to the end.

What is claimed is:

1. A method for use in a language translating and linking system including a language translator for translating a plurality of source programs into object programs, respectively, a memorizing unit for storing said object programs as memorized object programs, and a linker for linking said memorized object programs to a load program, one of said source programs including a calling program while another of said source programs including a called program, said calling program passing control to said called program, said calling program having a first number of calling parameters, said called program having a second number of called parameters, each of said calling parameters having calling attribute which represents a data item containing information descriptive of each of said calling parameters, each of said called parameters having a called attribute which represents a data item containing information descriptive of each of said called parameters, said method comprising the steps of:

extracting, in said language translator, said first number and said calling attributes from said calling program to generate first parameter information representing said first number and said calling attributes;

extracting, in said language translator, said second number and said called attributes from said called program to generate second parameter information representing said second number and said called attributes;

storing said first and said second parameter information in said memorizing unit as first and second output parameter information; and comparing, in said linker, said first output parameter information with said second output parameter information to check whether or not said calling parameters correspond to said called parameters, respectively.

2. A parameter checking apparatus for use in a language translating and linking system supplied with a plurality of source programs, said language translating and linking system including a language translator for translating said source programs into object programs, respectively, a memorizing unit for storing said object programs as memorized object programs, and a linker for linking said memorized object programs to a load program, one of said source programs including a calling program while another of said source programs including a called program, said calling program passing control to said called program, said calling program having a first number of calling parameters, said called program having a second number of called parameters, each of said calling parameters having a calling attribute which represents a data item containing information descriptive of each of said calling parameters, while each of said called parameters having a called attribute which represents a data item containing information descriptive of each of said called parameters, said parameter checking apparatus comprising:

extracting means, located in said language translator and supplied with said source programs, for extracting said first and second numbers and said calling and called attributes from said calling and called programs to generate first and second parameter information representing said first and second numbers and said calling and called attributes, respectively;

memorizing means, located in said memorizing unit and coupled to said extracting means, for storing said first and said second parameter information as first and second output parameter information; and comprising means, located in said linker and coupled to said memorizing means, for comparing said first output parameter information with said second output parameter information to check whether or not said calling parameters correspond to said called parameters.

* * * * *